March 24, 1970 S. E. TOWNSEND 3,502,806

MODIFIED RUN LENGTH DATA REDUCTION SYSTEM

Filed Aug. 1, 1966 5 Sheets-Sheet 1

INVENTOR.
STEPHEN E. TOWNSEND

BY Anthony D. Cennamo

ATTORNEY

March 24, 1970 S. E. TOWNSEND 3,502,806

MODIFIED RUN LENGTH DATA REDUCTION SYSTEM

Filed Aug. 1, 1966 5 Sheets-Sheet 2

INVENTOR.
STEPHEN E. TOWNSEND

BY Anthony D. Cennamo

ATTORNEY

March 24, 1970 S. E. TOWNSEND 3,502,806

MODIFIED RUN LENGTH DATA REDUCTION SYSTEM

Filed Aug. 1, 1966 5 Sheets-Sheet 3

INVENTOR.
STEPHEN E. TOWNSEND

BY Anthony D. Cennamo

ATTORNEY

MODIFIED RUN LENGTH DATA REDUCTION SYSTEM

Filed Aug. 1, 1966 5 Sheets-Sheet 4

INVENTOR.
STEPHEN E. TOWNSEND
BY
Anthony D. Cennamo
ATTORNEY

| COUNT | CODE | OUTPUT COUNT WORD B A B A B A |
|---|---|---|
| 1 | 0 | 0 0 |
| 2 | 1 | 1 0 |
| 3 | 0 0 | 0 0 0 0 |
| 4 | 1 0 | 1 0 0 0 |
| 5 | 0 1 | 0 0 1 0 |
| 6 | 1 1 0 | 1 0 1 0 0 0 |
| 7 | 0 0 0 | 0 0 0 0 0 0 |
| 8 | 1 0 0 | 1 0 0 0 0 0 |
| ⋮ | ⋮ | ⋮ |

INVENTOR.
STEPHEN E. TOWNSEND
BY Anthony D. Cennamo
ATTORNEY

United States Patent Office 3,502,806

Patented Mar. 24, 1970

3,502,806

MODIFIED RUN LENGTH DATA REDUCTION SYSTEM

Stephen E. Townsend, Rochester, N.Y., assignor to Xerox Corporation, Rochester, N.Y., a corporation of New York Filed Aug. 1, 1966, Ser. No. 569,314
Int. Cl. H04n *3/16*
U.S. Cl. 178—7.1 6 Claims

ABSTRACT OF THE DISCLOSURE

A selective encoding technique wherein a binary data waveform is investigated according to the expected informational content of a document or computer, or the like, output waveform and analyzed for the existence of data information. The information waveform is then encoded to reduce the redundant information before transmission to a remote printing location. In the encoding technique, the count word indicative of the successive number of digits detected as the same binary level is converted to a binary code word representative of such count. Control digits are placed between the digits representing the code word in order that the receiving apparatus will be able to detect the difference between a data and redundant information signal.

This invention relates to graphic communication systems and, more particularly, to methods and apparatus for reducing the bandwidth required for the transmission of binary information signals.

As is known in a normal facsimile system, a document to be transmitted is scanned at a transmitting station to convert information on the document into a series of electrical signals. These video signals, or carrier modulated signals corresponding thereto, are then coupled to the input of a communication link interconnecting the transmitter with the receiver. At a receiving station, the video signals, in conjunction with suitable synchronizing signals, selectively control the actuation of appropriate marking means to generate a facsimile of the document transmitted.

A principal application of facsimile equipment is the transmission of printed or typewritten documents and letters. It is a distinguishing characteristic of such original documents that printing or typing is arranged in substantially horizontal lines. Examination of a typical letter, for example, will show that lines of typing actually occupy considerably less than half the vertical dimension of the letter, the rest of its dimension being blank and corresponding to spaces between lines as well as blank spaces at the top and bottom of the letter. In a conventional facsimile system, all parts of such a letter are normally scanned at a uniform rate. Assuming transmission over an ordinary telephone line, it may take in the order of six to fifteen minutes to transmit an ordinary letter with reasonable resolution. Considering the cost of the telephone service, such a long transmission time becomes a serious limitation on the economic usefulness of facsimile equipment.

In addition, it is often desirable that the output binary information from an electronic computer or other digital output device be transmitted to one or more of a number of remote locations for output printing, or for permanent or temporary storage and subsequent readout. A transmission network similar to that used in a facsimile system would then be necessary for the transfer of information from the computer or the like to such a remote printer.

The signal redundancy inherent in computer or facsimile output waveforms, due, for example, to the fact that the waveform comprises two-level binary information and the attendant long periods of little or no information transmission, have led to the development of various encoding techniques to reduce such redundancy, thereby eliminating the wasted transmission time. One such encoding technique is known as run length encoding in which binary numbers corresponding to various blocks of binary data are transmitted rather than the usual binary signals. In such a system, a binary number of relatively few bits may be sent in lieu of a larger block of video data.

Such encoding techniques, while significantly reducing the number of binary digits or bits which must be sent and thereby reducing the transmission time, have not been entirely satisfactory. In a normal facsimile system, for example, the information is, in general, not uniformly spread over the document surface; thus, the rate at which the scanner presents information to the transmission channel varies with time and sometimes a complete scan line may consist of a single information bit, black or white. In a computer system, long periods of redundant information may be transmitted between information words which would not fully lend itself to prior art encoding techniques. For this reason, conventional binary transmission systems with known encoding techniques do not fully utilize the capacities of the transmission channels, and thus the high cost thereof remains prohibitively high.

It is, accordingly, an object of the present invention to provide methods and apparatus for efficiently utilizing the bandwidth capabilities of graphic communication and transmission systems.

It is another object of the present invention to optimize the information handling capability of transmission networks in graphic communication systems.

It is another object of the present invention to reduce the operating costs of transmitting binary data information waveforms that include long periods of redundant information.

It is still another object of the present invention to decrease the bandwidth requirement for binary information transmission.

In accomplishing the above and other desired aspects, applicant has invented novel methods and apparatus for reducing the redundant information in transmitted digital waveforms. There is disclosed a novel selective encoding technique wherein a binary data waveform is investigated according to the expected informational content on a document or in a computer, or the like, output waveform and analyzed for the existence of data information. The information waveform is then encoded to reduce the redundant background information before transmission to a remote printing location.

In accordance with one aspect of the present invention, both the successive binary digits of data or black information and the binary digits indicating white or redundant background information are encoded prior to transmission to the remote location. In a second aspect of the invention, only the background or redundant portions of the input signal are encoded for subsequent transmission. Depending upon the informational content of the input waveform, it may be more advantageous to transmit the data or black information as it occurs in the input waveform directly to the output transmission medium. Thus, if it is known that, for example, the run lengths of the data information will be appreciably shorter than the lengths of the background or redundant portions of the signal, transmission of such data information without the encoding thereof, while encoding the background or redundant information, would result in a superior compression factor.

When both the data and background redundant information are encoded, the count word indicative of the successive number of digits detected of the same binary level is converted to a binary code representative of such count. Control digits are placed between the digits representing the code word in order that the receiving apparatus will be able to detect the difference between a data and redundant information signal. In the instance where only the background redundant information is encoded, the black or data information is transmitted without encoding or insertion of a control digit, while the count number by its associated code word is encoded as was previously described.

For a more complete understanding of the invention, as well as other objects and further features thereof, reference may be had to the following detailed description in conjunction with the drawings wherein:

FIG. 5A is an illustrative embodiment of a selective binary encoder in accordance with the principles of the present invention; while

Figure 1:
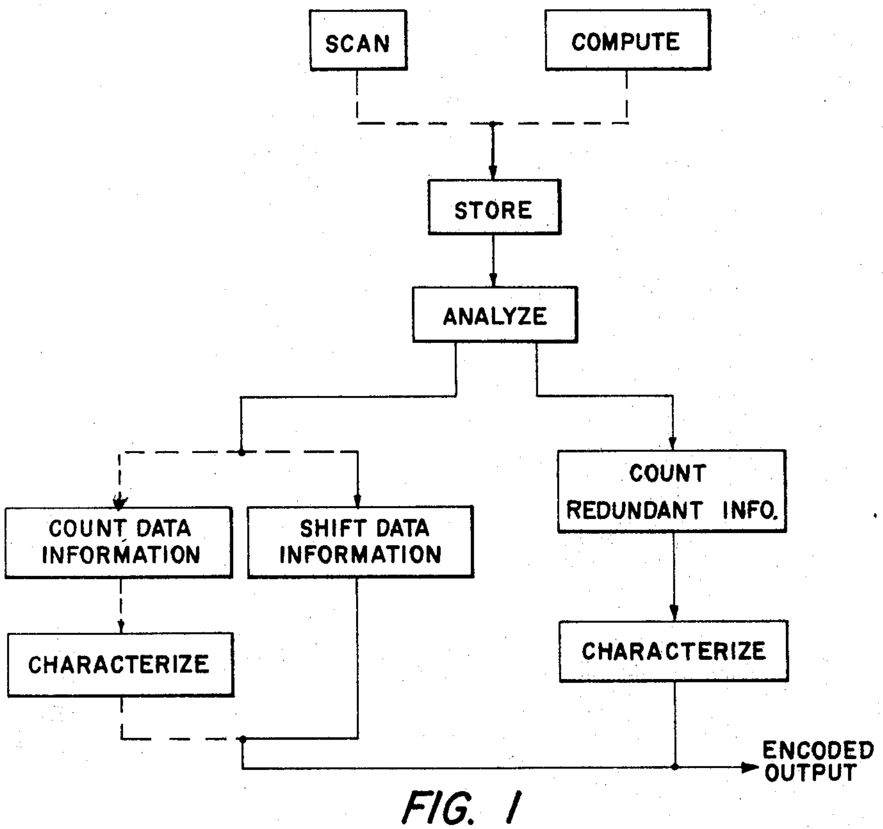
FIG. 1 is a flow diagram illustrating the encoding operation for transmission of data information from a facsimile transmitter or other binary information source according to one aspect of the present invention.

Referring now to FIG. 1, there is shown a flow diagram of the different aspects of the present invention. Binary data information from a facsimile scanner, an electronic computer, or the like, in a manner hereinafter more fully described, is serially stored and sequentially analyzed for the existence of printed or data information signals. With either aspect of the present invention, the background or redundant information is detected and the successive binary digits comprising such background redundant information is used to advance a counter by one count for each such binary digits detected in the successive run length. The count word is then characterized with identifying or label binary digits before transmission. The characterizing digits are utilized so that the receiving apparatus will recognize the difference between an encoded count number of successive white or background redundant digita and the information representative of black or data information.

In accordance with one aspect of the present invention, the black or data information is detected and counted in a manner similar to that for the white or background redundant information. After counting of the successive digits representing black or data information, such count word is characterized with a different binary label and transmitted to the receiving apparatus. In this aspect of the invention, therefore, the output encoded waveform will consist of alternate count words of successive white or background redundant information and black or data information along with the respective binary characterizing labels.

In accordance with a second and preferred aspect of the invention, the black or data information is transferred directly to the output signal waveform without encoding or counting thereof, but as it appears in the input waveform. As will be more fully hereinafter described, such transmission of black or data information without encoding may increase the overall compression factor of the system depending upon the distribution of data information in the input waveform. That is, if the successive runs of data or black information are short as compared to the average runs of the white or background redundant information, such transmission without encoding would be more beneficial than counting and encoding in a manner similar to that for the white or background information. For this aspect of the invention, therefore, the output encoded waveform would comprise encoded binary words representative of the white or background information alternatively with binary words representing the actual black or data information as it appears in the input waveform.

Figure 2:
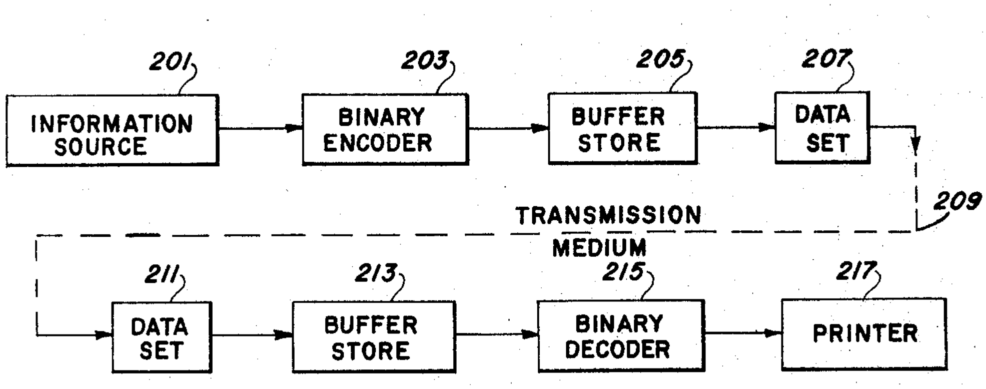
FIG. 2 is a block diagram of a data transmission system employing the principles of the present invention.

Referring now to FIG. 2, there is shown a graphic communication system utilizing the principles of the present invention. The transmitter portion of the system includes an information source 201 which could be a facsimile scanning device, an electronic computer device or the like. A facsimile scanner, in a normal manner, derives individual pulses corresponding to black and white picture elements or dots forming the pictorial material explored by the scanner. The scanner may be any of the mechanical or electronic devices well known in the art for translating the densities of elemental areas of typed or pictorial copy into signal waveforms. The scanner may conveniently include a light source, such as a cathode ray tube, an optical system which delineates elemental areas of the subject copy, means for systematically moving one with respect to the other in two directions, and a light-sensitive detection device together with directly associated circuits. Included in a scanner are the normal facsimile circuits, such as, deflection, synchronizing and time-quantizing circuits, which convert the analog information to a digital output signal.

The information source 201 may also comprise an electronic computer of any known design. Such a computer would comprise the normal address, operation, and output circuits, together with the digitizing and time-quantizing circuits to supply a binary digital output in the event that the computer is of the analog type. The computer utilized must have a serial information output, or be provided with a parallel-to-serial conversion device, of any known design, such that the encoding device, as hereinafter set forth, may effectively reduce the redundancy occurring in such output signals. The output from the information source 201 is coupled to a binary encoder 203, which is more fully hereinafter described in conjunction with FIG. 5A.

Figure 5A:
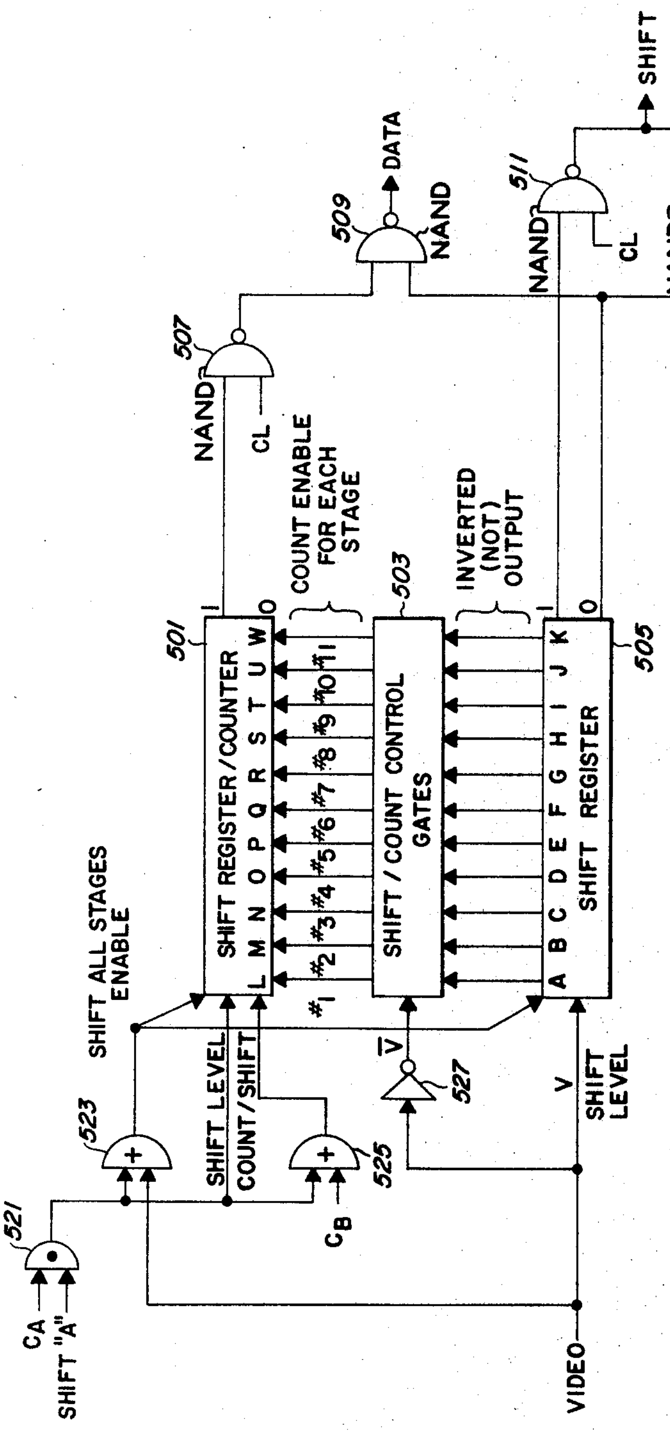

The output from the binary encoder 203 is coupled to the input of buffer store 205, in a manner more fully described in conjunction with the encoder of FIG. 5A. The output information is stored temporarily at the buffer store 205 before transmission to the receiver. The buffer store 205 may comprise a logical flip-flop circuit arrangement or a magnetic core matrix, for example. The encoded waveform is received from the binary encoder 203 by the buffer store 205 as the information is encoded. However, the information to be transmitted over the transmission medium is drawn from the buffer store at the rate which will approach the maximum rate compatible with the bandwidth capability of the medium itself.

At the input and output ends of the transmission medium 209 are circuits 207 and 211 for providing compatibility between the transmitter and receiver circuits and the transmission medium. The circuits, commonly called data sets, provide impedance matching and power amplification and/or modulating apparatus. Such data sets may comprise line drivers or a frequency shift keyer. A clock source of known frequency may also be provided for transmission synchronization.

The transmitted digital information is received over the transmission line 209 from data set 207 at data set 211. The data set 211 transfers the information from the transmission mode to that compatible with the operation in the receiver. Input buffer store 213, similar to the output buffer store 205, receives the information from the data set 211 and is drawn upon by the binary decoder 215, which is compatible with the binary encoder 203 more fully described in conjunction with FIG. 5, to reconstruct the signal waveform with its associated redundancy.

Coupled to the binary decoder 215 is the output printer 217. The printer 217 may comprise a flying spot scanner including a cathode ray tube similar to the type that may be employed in a facsimile transmitter as set forth in conjunction with information source 201. The electron beam of the cathode ray tube in the printer is selectively gated on in response to the received data signals, thus generating an information modulated source of light rays for selectively illuminating elemental portions of the light-responsive, photoreceptor surface of a xerographic printer. For complete understanding of a xerographic facsimile printer, for example, reference may be had to U.S. Patent No. 3,149,201, issued Sept. 15, 1964, to C. L. Huber et al. It is to be understood, however, that the xerographic facsimile printer is exemplary only and other types of printers known in the art may be employed in practicing the present invention.

Figure 3:
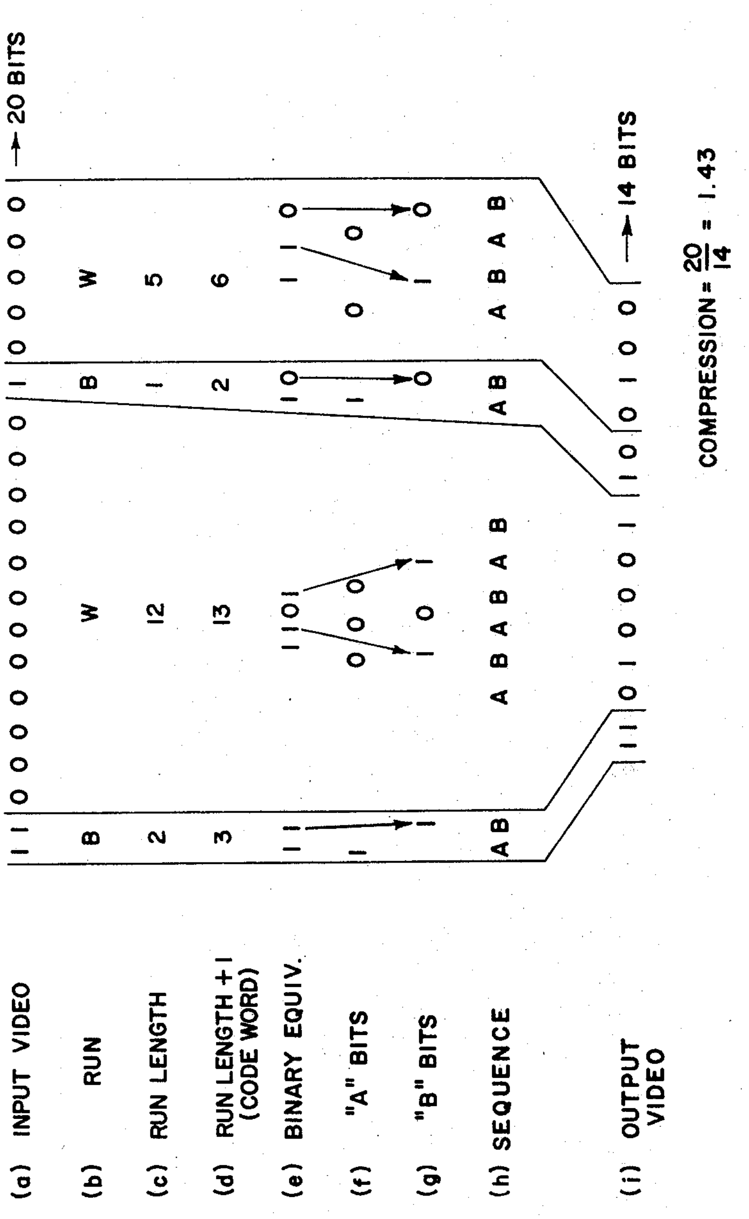
FIG. 3 is a representative diagram of part of a data information waveform useful in understanding a first aspect of the present invention.

FIG. 3 is a representative diagram of a portion of a data information waveform and its associated encoded waveform obtained by utilizing one aspect of the present invention. The disclosed encoding technique reduces the number of binary digits necessary to represent a message in digital data form. The technique is most effective if the data is likely to consist of groups of a predetermined number of consecutive binary digits of the same level and when groups of one are in the majority. For purposes of definition, binary zero digits would be the most probably occurring and, in a facsimile scanner, would be considered as white or background information, while binary one digits would be considered as the existence of black or printed information. In the output from a computer, the binary one digits would comprise the information while the binary zero digits would be the remaining background redundant information.

In the basic form of the code as disclosed, the output data stream comprises two types of binary digits which alternate. That is "A" bits may be thought of as label bits while "B" bits comprise the coded binary count number. Efficiency may be increased when it is noted that, if exactly the number of binary digits required are allotted for each count number, the most significant bit, which will always be a binary "1," need not be transmitted but can be automatically assumed by a binary decoder. However, a complication arises in the inability to distinguish between run lengths of one and two, written 1 and 10, as there is no such thing as a non-existent "B" bit. This condition may be overcome by adding a numerical count of one to all run lengths detected so that one and two are written 10 and 11, or with the most significant bits left off as "0" and "1."

The portion of the data information waveform, as shown in FIG. 3, comprises a run length of five binary zero digits, a binary one digit, twelve binary zero digits, and two binary one digits, reading from the right in time relation. As was hereinbefore set forth, the binary zero digits indicate white or background redundant information while the binary one digits indicate black or data information. Lines *b* and *c* indicate the binary state of the run length, as black or white, and the length of the run itself. As stated in the previous paragraph, it is desirable to drop the most significant binary one digit which can be assumed to be present by the decoder. However, runs of one and two become indistinguishable and therefore the technique calls for adding a numerical count of one to each detected run length. Thus, in line *c*, the run length of five becomes a code word length of six, the run length of one becomes a code word length of two, and so on.

As FIG. 3 exemplifies the encoding of the input video stream for both black or data and white or background information, according to one aspect of the present invention, the detected run lengths of the data and background information are then converted to their respective binary count equivalents. Thus, the code word length of six becomes the binary equivalent number 110, the code word length of two becomes the binary number 10, the code word length of thirteen becomes the number 1101, and the code word length of three becomes the number 11.

Inasmuch as the decoder would not be able to interpret the difference between a black and white representative count number, the characterizing label bits must be inserted before transmission. Binary one has been designated as the black label bit while binary zero has been designated as the white label bit, but it is apparent that such designation could be reversed if desired. In line *f* cen be seen the placement of the "A" or label bits. As the run lengths have been increased by a numerical count of one so that the most significant digit on each binary equivalent count number can be dropped, the sequence therefor can be seen in reference to line *g*. For example, for the code word length of six, indicating white information, the binary equivalent number 110 is brought down as the word 10, dropping the first significant binary digit, making up the "B" bit word.

For each "B" binary digit comprising the coded binary equivalent count number there must be an associated "A" bit therefor. The sequence in line *h* is thus a combination of the "A" and "B" bits shown in lines *f* and *g*. Line *i* is the output video waveform shown in the binary equivalent as fourteen binary digits. For this short segment of the input video information, the original twenty binary digits have been encoded as fourteen binary digits with a resultant compression factor of 1.43:1.

Figure 4:
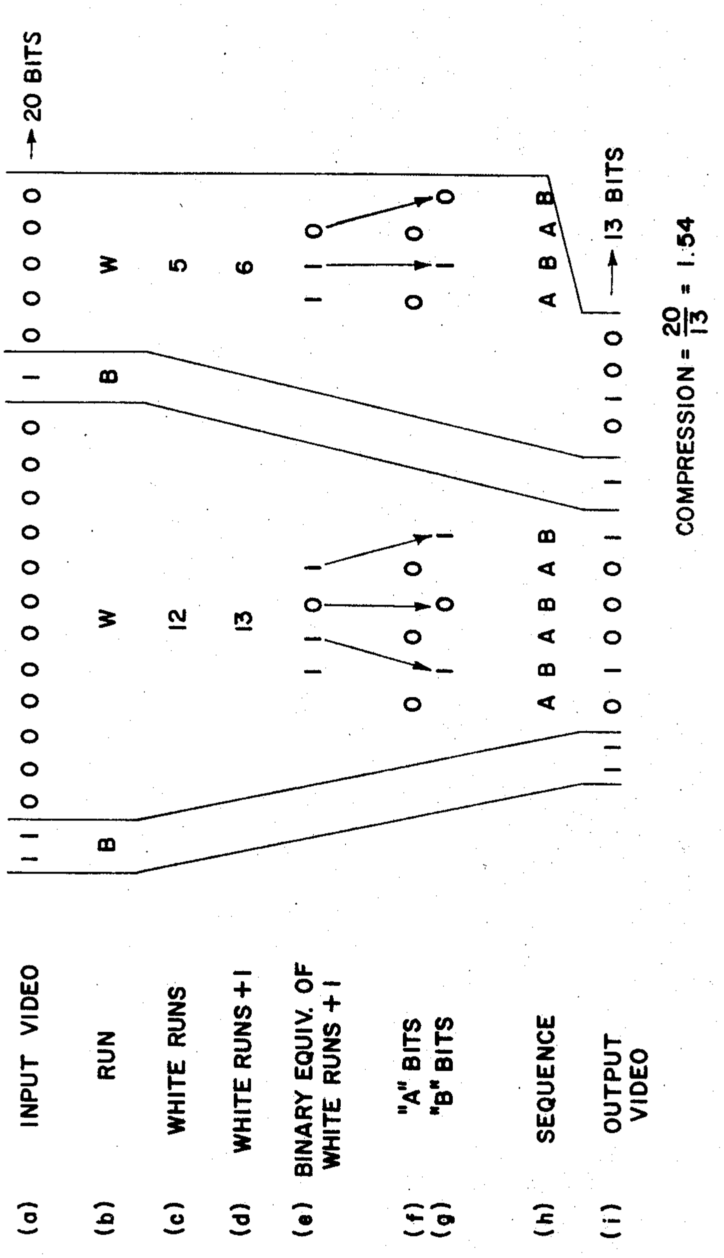
FIG. 4 is a representative diagram of part of the data information waveform useful in understanding a second aspect of the present invention.

FIG. 4 is a representative diagram of the same portion of a data information waveform as shown and described in FIG. 3. In this embodiment, however, only the white or background redundant information signals are encoded, while the black or data information is transmitted exactly as it occurs in the input video waveform. In a similar manner, therefore, as shown and described in conjunction with FIG. 3, the run lengths of the white information are increased by one as in line *d*, converted to its binary equivalent as in line 3, "A" and "B" binary digits determined in lines *f*, *g* and *h*, and converted to its binary equivalent in line *i*. The black information, however, is not encoded or acted upon in any way but is simply inserted in the output video waveform in the same sequence as occurring in the input video waveform. In this instance, the incoming twenty binary digits have been encoded into thirteen binary digits giving a resultant compression factor of 1.54:1.

It can therefore be seen that if the runs of the black information are short as compared to the lengths of the background or white information, the compression factor is improved by not coding the black information but transmitting such information as normal video information. As was hereinbefore set forth, the informational content of the input video information must be determined before the decision can be made whether to code or not to code the input black information.

Referring now to FIG. 5 there is shown an embodiment of an encoder that is compatible with the principles of the present invention. The binary data information, whether from a facsimile scanning device or other binary digital source, is coupled to the input of shift register 505, the input of OR gate 523, and after inversion at inverter 527, to shaft/count control gates 503. The shift/count control 503, which is coupled to shift register 505, is a logic circuit arrangement used to cause shift register/counter 501 to shift or count pulses according to the information identification of the binary signals being shifted into shift register 505. Shift/count control 503 causes shift register counter 501 to selectively shift selective stages thereof according to specific logic instructions from shift/count control 503 on detection of black or data information and to count on white or background redundant information. Thus, both shift register 505 and shift register/counter 501 will shift along selectively the black information data as it fed into shift register 505, while shift register/counter 501 will count the number of binary digits indicating white or background information as this information occurs in the input data waveform.

By defining black or data information as binary one digits and white or background redundant information as binary zero digits, shift register 505 will shift along binary one digits for detected black information as shift register/counter 501 shifts binary zero digits. When white or binary zero information is detected, the shifting operation will be interrupted, as the shift register/counter 501 counts the number of binary zero digits in the input waveform, while shift register 505 enters into its storage capacity binary zero digits in the adjacent storage positions as occupied by the count number in shift register/counter 501.

In operation, therefore, the shift/count control 503 monitors the inverted or "not" outputs of the stages A through K in shift register 505. Inasmuch as the input information will be constantly changing, the logic equations for the separate functions will be given instead of a specific example of a particular portion of the input video. Thus, the conditions for counting in the stages L through W in shift register/counter 501, would occur when the following conditions are fulfilled:

$$\#1=\overline{V}\cdot\overline{A};\ \#2=\overline{V}\cdot\overline{A}\cdot\overline{B};\ \#3=\overline{V}\cdot\overline{A}\cdot\overline{B}\cdot\overline{C};\ \ldots;$$
$$\#11=\overline{V}\cdot\overline{A}\cdot\overline{B}\cdot\overline{C}\ \ldots\ \overline{K};$$

where V=black, and $\overline{V}$=white, and A and B, etc., are the inverted outputs from shift register 505.

With the count function as given above, the shift A function for the circuit would be $$\text{Shift } A=(A+L\cdot B+L\cdot M\cdot C+L\cdot M\cdot N\cdot D+L\cdot M\cdot N\cdot O\cdot E+\ldots+L\cdot M\cdot N\cdot O\ \ldots\ U\cdot K+L\cdot M\cdot N\ \ldots\ W)\overline{V}$$

where A, B, C, etc., are the outputs of the particular stages of registers 501 and 505.

Figure 5B:
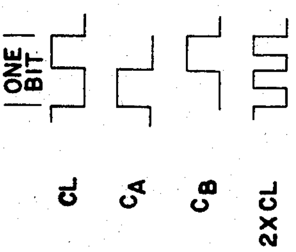
FIG. 5B is a timing diagram used in FIG. 5A.

As the count and shift function cannot occur at the same time, two separate clock pulses are provided within one bit time to provide the necessary operational pulses as seen in FIG. 5B. Thus, the video information would appear at the input to gates 523 and the input to shift register 505. According to the shift A function as determined above, AND gate 521 would be enabled during the $C_A$ clock pulse which would provide the shift enable signals to shift register/counter 501 and the shift register 505. In addition, the output from AND gate 521 would be the shift level signal which would be shifted into the shift register/counter 501 at the clock pulses $C_A$. At the input of white information the count enable signals for each stage of the shift register/counter 501 would be provided as shown above in the count equation. Clock pulses $C_B$ would be provided through OR gate 525 to provide the count/shift signal depending upon the information input on the video line. Thus, shift register 505 would receive the black or data information, while shift register/counter 501 would be counting the white information, the shifting operation taking place at the proper interval between changes of black to white or white to black information. Shift register/counter 501 and shift register 505 may comprise conventional logic circuitry, while shift/count control 503 may be constructed by one skilled in the art in accordance with the logic equations given above.

Figures 6A, 6B:
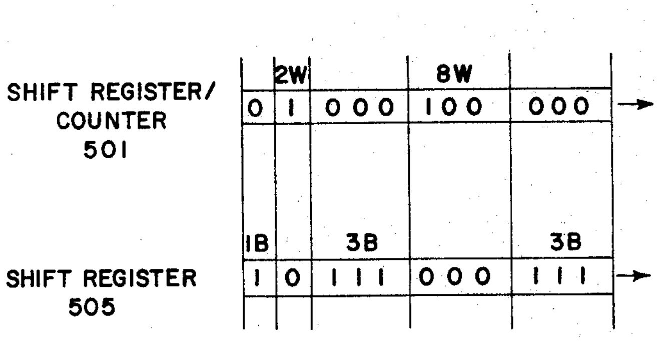
FIGS. 6A and 6B are representative diagrams useful in understanding the operation of the binary encoder as shown and described in FIG. 5.

For a fuller understanding of FIG. 5, reference will be made to FIGS. 6A and 6B which show the encoding of a portion of the data input waveform, wherein the black or data information is transmitted without the encoding thereof, and the consecutive white or binary zero information is counted and encoded according to the principles of the present invention. FIG. 6A shows the build-up of the code words representing the count numbers as detected and generated in shift register/counter 501. In this instance where the binary one or black data information is transmitted as straight facsimile or data information, the code words for the counts of the consecutive binary zero digits must have inserted the extra binary zero digits between the binary digits comprising the code words, such that the receiver will be able to interpret a binary encoded word for the white information from the black information transmitted as straight binary data. The underlined digits in FIG. 6A are the actual code digits, while the other binary zero digits are the code or control digits inserted for purposes of encoding the count words.

FIG. 6B shows the relationship of the stored information as available in shift register 505 and shift register/counter 501, when the first binary digits of the input waveform data have been shifted through to the last storage position in the respective shift registers 505 and 501. For purposes of example, FIG. 6B has been shown to comprise a waveform of three black information digits, eight white information digits, then three black digits, two white digits, and one black digit in the input waveform. In the figure, it can be seen that the binary one digits comprising the separate lengths of black information are stored in the shift register 505. In the shift register/counter 501, binary zero digits are entered into the storage positions of the shift register/counter in the positions adjacent to the black information digits in shift register 505. Binary zero digits are entered into the storage positions of shift register 505 which are adjacent to the positions occupied by the encoded count words in the shift register/counter 501.

More specifically, the three binary one digits in shift register 505 are representative of the first three black binary digits in the input waveform. The encoded count word for the eight white or binary zero digits detected is stored in shift register/counter 501. As can be seen in FIG. 6A, the count of eight and its respective code word is the same as the stored code word in shift register/counter 501. The next three binary digits are binary one digits indicating the next three digits are black information and thus is stored in shift register 505. The next code word of binary one is representative of a count of two white digits and is stored in the shift register/counter 501. The last storage position in shift register 505 is a binary one representative of one digit of black information data.

With the storage positions of shift register 505 and shift register/counter 501 occupied as shown and described in FIG. 6B, the circuit of FIG. 5A will be more fully described in conjunction therewith to indicate how the stored information is transferred to the output buffer store 205, as seen in FIG. 2. The first three binary one digits as seen in shift register/counter 501 in FIG. 6B, reading from the right, will enable NAND gate 507. A clock pulse source, as seen in FIG. 5B, providing clock pulses at the input information rate, is the other input to the NAND gate 507. With both inputs thereof at the binary one level, a binary zero level will appear at the output of NAND gate 507 and thus the input to NAND gate 509. The reset or zero output from shift register 505, being at the binary zero level, enables NAND gate 509. Thus, the first three binary one digits are shifted out of the shift register/counter 501 at the output of NAND gate 509 to the output buffer store.

With the clock pulse source at one input to NAND gate 511, and the binary one level for the first three binary one digits in shift register 505 at the second input, the output of NAND gate 511 will be at the clocked binary one level. This binary one output level is used as a shift pulse to cause the output buffer store 205 in FIG. 2 to shift in the data information as it appears at the output of NAND gate 509.

With one input to NAND gate 517 being a clock signal at two times the clock rate, see FIG. 5B, and the other input being the binary one level from the reset output of shift register 505, NAND gate 517 is effectively enabled. With NAND gate 517 enabled, the binary zero output thereof appears on the shift line to the output buffer store. However, the binary one clocked level from the output of NAND gate 511 is the signal that effectively shifts into the output buffer store additional data from NAND gate 509.

The next three binary digits in shift register/counter 501, after the first three binary one digits as just described, are indicative of the coded count number of successive binary digits at the binary zero level. With the set or binary one input from shift register/counter 501 now being at the binary zero level, NAND gate 507 is effectively disabled. The binary one level, as an output from the NAND gate 507, now effectively enables NAND gate 509 along with the binary zero output from the reset terminal of shift register 505. With a binary one level appearing on both inputs to NAND gate 509, the gate is effectively enabled and binary zero level appears on its output line. NAND gate 517 now has as its inputs the binary zero level from shift register 505 and the two times clock signal on the second input thereof. Thus, the output of NAND gate 517 appears at twice the clock frequency as long as the information being shifted out at this point is representative of the white information counted.

The output from NAND gate 517 is the shift pulse to the output buffer store. This pulse now shifts in the output binary zero from NAND gate 509 as a code bit along with an additional binary zero digit as the control digit. This is necessary in accordance with the principles of the invention as seen in the output count word as shown and described in FIG. 6A. The output shifting operation continues with the black or binary one information being shifted directly into the buffer store; while the count words representative of the number of consecutive binary zero digits detected are shifted out along with their respective binary zero control digits.

In the foregoing, there has been disclosed methods and apparatus for reducing the redundant information content in a digital data transmission system. While the embodiments have been described with the data information encoded with the binary equivalent count number separated with characterizing binary labels, any distribution of the binary labels could be utilized according to the expected informational distribution of the data waveform that would maximize the encoding process. Other logic components may be utilized for similar encoding distributions without departing from the principles of the present invention. In addition, logic NAND gate circuitry, together with flip-flop circuits, have been disclosed and described; however, it is apparent that other logic circuitry could be designed by one skilled in the art to perform the same or equivalent functions. The binary equivalent count numbers are shown and described as being in the strict binary convention, but it is apparent that other representations may be used, as for example, the Gray scale or the like. Thus, while the present invention, as to its objects and advantages, as described herein, has been set forth in specific embodiments thereof, they are to be understood as illustrative only and not limiting. It is applicant's intention, therefore, to be limited only as indicated by the scope of the appended claims.

What is claimed is:

1. The method of reducing redundancy encoding of information transmitted by binary electrical signals, comprising the steps of:

analyzing said binary electrical signals for binary digits of a first and second binary level;

counting the number of successive binary digits within each group of said first binary level digits and each group of said second binary level digits;

generating binary characterizing digits of a first and second binary level;

transmitting the binary digits comprising the count number of the successive first level binary digits alternately with the binary characterizing digits of said first binary level; and further transmitting the binary digits comprising the count number of the successive second level binary digits alternately with the binary characterizing digits of said second binary level.

2. The method of reduced redundancy encoding of information transmitted by binary electrical signals, comprising the steps of:

analyzing said binary electrical signals for binary digits of a first and second binary level;

counting the number of successive binary digits of said first binary level;

converting the count number into a representative binary word;

dropping the most significant digit in said binary word;

generating binary characterizing digits of a first binary level;

transmitting an equal number of said first binary level characterizing digits alternately between the digits comprising said binary word; and further transmitting the binary digits representing the successive digits of said second binary level.

3. The method as defined in claim 2 additionally including the steps of:

counting the number of successive binary digits of said second binary level;

converting the count number into a representative binary word;

dropping the most significant digit in said binary word;

generating binary characterizing digits of a second binary level, and wherein the step of further transmitting includes:

transmitting an equal number of said second binary level characterizing digits alternately between the digits comprising said binary word.

4. The method as defined in claim 2 wherein said step of counting includes:

adding a numerical count of one to the count number of successive binary digits of said first binary level.

5. The method as defined in claim 3 wherein said step of further counting includes:

adding a numerical count of one to the count number of successive binary digits of said second binary level.

6. In a graphic communication system, a binary encoder for reducing the redundancy in a binary signal waveform comprising:

first shift register means for serially storing the input binary digits of a first binary level representative of data information;

second shift register means for counting the successive number of binary digits of a second binary level representative of redundant background information;

means for shifting said first shift register means the number of binary digit positions equal to the binary digit positions occupied by the count number in said second shift register means and for shifting said second shift register means the number of binary digit positions equal to the number of binary digit positions occupied by the first level binary digits in said first shift register means;

first gating means coupled to said first and second shift register means for transmitting the contents of said registers;

a first clock pulse source of predetermined frequency;
an output buffer store;
second gating means coupled to said first shift register means and said first clock pulse source for shifting out the information from said first shift register means and said first gating means to said output buffer store;
a second clock pulse source at least twice the frequency of said first clock pulse source; and
third gating means coupled to said second shift register means and said second clock pulse source for shifting out the information from said second shift register means and said first gating means to said output buffer store, said second clock pulse source operating to insert binary characterizing digits between the digits comprising the binary count number stored in said second shift register in between the clock pulses provided from said first clock pulse source.

References Cited

UNITED STATES PATENTS

| | | | |
|---|---|---|---|
| 2,909,601 | 10/1959 | Fleckenstein et al. | 179—15.55 |
| 2,963,551 | 12/1960 | Schreiber et al. | 179—15.55 |
| 2,922,840 | 1/1960 | Lally | 178—6.6 |
| 2,978,535 | 4/1961 | Brown | 178—6 |

JOHN W. CALDWELL, Primary Examiner

A. H. EDDLEMAN, Assistant Examiner

U.S. Cl. X.R.

178—6; 179—15